United States Patent [19]

Sullivan

[11] 4,067,810
[45] Jan. 10, 1978

[54] FLUID FILTER MAGNET ASSEMBLY

[75] Inventor: Daniel W. Sullivan, Grosse Pointe, Mich.

[73] Assignee: Ofco, Inc., Detroit, Mich.

[21] Appl. No.: 656,732

[22] Filed: Feb. 9, 1976

[51] Int. Cl.² .............................................. B01D 35/06
[52] U.S. Cl. .................................... 210/223; 209/224; 252/62.54; 335/303
[58] Field of Search ................ 210/222, 223; 335/303; 252/62.51, 62.52, 62.53, 62.54; 209/224

[56] References Cited

U.S. PATENT DOCUMENTS

| | | | |
|---|---|---|---|
| 2,999,275 | 9/1961 | Blume, Jr. | 210/222 X |
| 3,034,651 | 5/1962 | Morrell | 210/222 |
| 3,191,106 | 6/1965 | Baermann | 335/303 X |
| 3,206,657 | 9/1965 | Morlya | 335/303 |
| 3,213,335 | 10/1965 | Bourne | 335/303 |
| 3,289,841 | 12/1966 | Quintiny | 210/223 X |
| 3,313,416 | 4/1967 | Rosaen | 210/223 X |
| 3,334,737 | 8/1967 | Dreyfus | 206/497 |
| 3,369,655 | 2/1968 | Harrison | 206/497 |
| 3,371,790 | 3/1968 | Kudlary et al. | 210/223 |
| 3,456,780 | 7/1969 | Forman | 206/497 |
| 3,480,145 | 11/1969 | Gladden | 210/223 |
| 3,680,705 | 8/1972 | Happ | 210/222 |
| 3,764,539 | 10/1973 | Cochardt et al. | 252/62.53 |
| 3,841,489 | 10/1974 | Combest et al. | 210/223 |
| 3,887,469 | 6/1975 | Hayashi | 210/223 |

Primary Examiner—Theodore A. Granger
Attorney, Agent, or Firm—Burton, Parker & Schramm

[57] ABSTRACT

A magnetic filter element comprises a rubber bonded barium ferrite permanent magnet strip enclosed in a thin, liquid impervious, non-magnetic envelope and positioned in a low velocity location in a fluid system to capture magnetically attractable contaminants. The disclosure illustrates various arrangements of the magnet with filter cartridges as well as the construction of the magnet element itself.

22 Claims, 17 Drawing Figures

FLUID FILTER MAGNET ASSEMBLY

FIELD OF INVENTION

This invention relates to filters for removing magnetically attractable contaminants from fluid systems. More particularly, the invention relates to magnetic filters for removing magnetically attractable contaminants from liquids in, for example, but not limited to, reservoirs, sumps, housings, and hydraulic systems containing, for example, mineral oil, kerosine, water/glycol or phosphate ester base mixtures, lubricating oils, transmission oils, fuel oils, and gasoline.

BACKGROUND OF THE INVENTION

It has become the practice in many hydraulic, transmission, and engine lubricating systems, to provide a magnet whose function is to capture and retain magnetically attractable particles entrained in the fluid medium in the system, and thus protect the pumps, seals and other components of the system from abrasive damage or the like should such particles be allowed to freely circulate through the system. In some instances the magnet is associated with a filter cartridge or element which will filter out other undesirable contaminants and the combination thus provides a filter which will capture and remove both magnetically attractable and non-magnetically attractable contaminants. In this type of filter the magnets have generally been of the following types:

A. ALNICO magnets, comprising a mixture of aluminum, nickel, and copper. These magnets are limited in size and shape that can be readily manufactured, and are somewhat brittle and costly.

B. Ferrite permanent magnets, which are formed as a ceramic article such as a disc or the like, and which while less costly than the ALNICO magnets, must be cast and/or machined into the desired shape, and are quite brittle.

C. Ferrite particle magnets which comprise ferrite particles injection molded or extruded in a plastic vehicle body such as nylon, polyester, etc. While less brittle than the first two types, these magnets have a relatively low magnetic energy field and involve a high tooling cost.

D. Rubber bonded barium ferrite magnets, sold under the trademark PLASTIFORM, by 3 M Company, in which the barium ferrite particles are highly oriented during processing. These magnets, while possessing satisfactory magnetic strength, break down if exposed to hot hydraulic oils and other liquid media often encountered in systems in which it would be desirable to use the magnets, and the resulting pieces of the magnet can enter the fluid system as contaminants.

Brittleness of types A and B mentioned above imposes serious limitations not only on the mounting of the magnets to avoid fracture under vibration and fluid pressure forces, but in cleaning them for reuse great care must be taken to guard against inadvertent breakage. Breaking or chipping of these magnets while in use allows the detached pieces to foul the system and cause premature wear or failure of the system components. Because of the difficulty in cleaning these types of magnets it is often cheaper to replace them than to clean them.

The weakness of the magnetic field of type C mentioned above and the deterioration of type D has militated against their use. If type D deteriorates or delaminates, deleterious particles can enter the fluid system leading to early wear or failure of the system components.

However, the type D magnet mentioned above, because of its low cost, ductility or flexibility, high magnetic field strength, and ease with which it may be shaped, would be a highly desirable type of magnet to use if the problem of deterioration and delamination in the presence of the liquid to be filtered could be inexpensively solved while not adversely affecting its field strength, and at the same time the magnet rigidified somewhat so that it could become part of a structural filter assembly.

SUMMARY OF THE INVENTION

I have discovered how the PLASTIFORM magnet may be utilized as a fluid filter element without destruction by the fluid medium of the system in which it is placed and at the same time without materially increasing its cost or decreasing its field strength. Tests have been conducted on my designs with completely satisfactory results.

In carrying out my invention lengths of the PLASTIFORM magnet having a square or rectangular cross section, hereinafter called strips, are shielded from the liquid in the fluid system by enclosing them in a thin liquid impervious envelope of nonmagnetic material, whereby only a small air gap exists between each magnet strip and the liquid in the system and the liquid cannot reach the strip to cause deterioration thereof. Various forms of envelopes are shown. One is desirably constructed of a heat shrinkable polyester which encloses and is tightly shrunk about the strip. This form of envelope may comprise either a polyester seamless tube or a spiral wrapped tube (like a soda straw) into which the strip is inserted with the tube thereafter tightly shrunk thereabout. The ends of the tube may or may not be sealed as dictated by the fluid of the system in which the magnet is to be used.

Another form of the envelope may comprise a thin wall nonmagnetic metal tube. The metal envelope adds strength and rigidity to the otherwise flexible or limp strip and enables the strip to be incorporated as a structural part of a magnetic filter assembly or an element which may be rigidly mounted on or in a filter environment.

Rigidification of the stick when enclosed in the polyester heat shrinkable plastic film may be accomplished by laminating it with a metallic laminae such as ferromagnetic strips which will not only make the magnet strip rigid but also enhances its magnetic field strength. The thus laminated strip is enclosed in a heat strunk plastic envelope as aforesaid.

I have also discovered that both the location and/or orientation of the magnet strips contributes to their effectiveness as well as the efficiency of the filter with which they are associated. For example, the strips should preferably be located in areas of relatively slowly moving liquids, and oriented such that all fluid flow passes through their magnetic fields. In some instances the pole faces are advantageously oriented to lie parallel to the direction of flow rather than perpendicular thereto. Other features, advantages, and more complete description is hereinafter delineated.

BRIEF DESCRIPTION OF PREFERRED EMBODIMENTS

Figure 16:
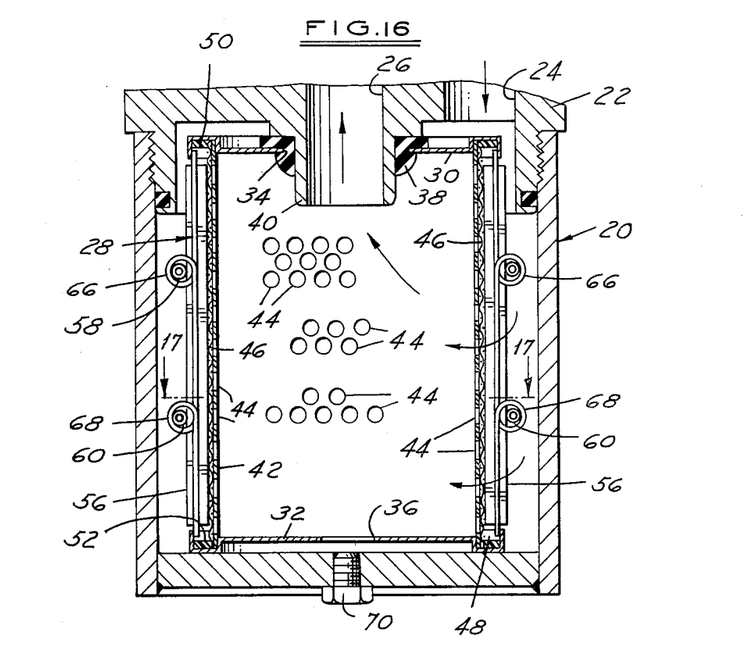
FIG. 16 is a vertical cross sectional view through another filter embodying my invention.
Figure 17:
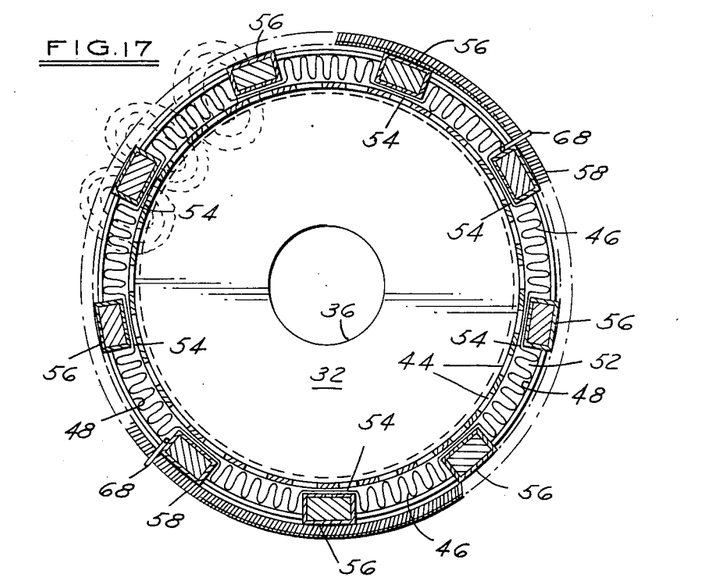
FIG. 17 is a cross sectional view taken on the line 17—17 of FIG. 16.

Referring first to FIGS. 16 and 17, I have shown a fluid filter illustrating the use of my improved magnetic filter elements. A conventional filter enclosure is shown at 20 screw threaded in sealed relation to a mounting portion 22 having fluid inlet and outlet 24 and 26. Portion 22 is part of the fluid pressure system whose fluid is to be filtered. Removably received with the enclosure is a filter 28. The filter includes opposed circular or disc-like end plates 30 and 32, each centrally apertured at 34 and 36. A sealing grommet or gasket 38 mounted in aperture 34 seals the joint between the end plate 30 and the outlet nipple 40 which is an integral part of mounting portion 22.

Extending between end plates 30 and 32 is a cylindrical wall structure comprising an inner cylindrical wall having perforations 44 throughout its area and an outer cylindrical corrugated screen wall 46 having a fine mesh adapted to prevent flow therethrough of entrained contaminants exceeding the mesh size. The inner wall 44 serves to support the relatively more flexible corrugated screen wall against inward collapse. Both walls are received in annular grooves 48 and 50 in the end plates and may be secured and sealed therein as by a bead 52 of epoxy sealer or braze material. The corrugated wire mesh screen wall 46 is provided at equal circumaxial locations with wider corrugations or elongated pockets 54 within which are received elongated magnetic filter elements 56. Means for removably retaining the magnetic filter elements in the pockets may comprise a pair of "garter springs", i.e., tension springs 58 and 60 in the form of endless loops. A pair of positioning and spacing elements 62 and 64, each formed of a length of stiff wire having a pair of spaced eyes 66 and 68 encircling the springs 58 and 60, have opposite ends received in the annular grooves in the end plates. The spacing elements may lie in the grooves defined by the corrugations.

The foregoing is the general arrangement of one form of a filter assembly utilizing my improved magnetic filter elements. Fluid to be filtered enters the enclosure at 24, and as shown by the arrows passes through the wall structure of the filter to the interior thereof and then out through the outlet 40. Thus the fluid must sweep by the magnet elements 56 before passing through the wall structure, and magnetically attractable particles in the fluid are captured by the magnetic elements. The filter 28 and enclosure 20 are preferably formed of non-magnetic material and thus do not interfere with the magnetic fields which are schematically illustrated for a pair of the magnetic elements in FIG. 17. The fields bridge the spaces between the magnetic elements and attract to the magnets and capture ferromagnetic particles in the fluid flowing through the wall structure of the filter.

When it is deemed desirable to clean the filter, a drain plug 70 is removed to allow the oil or other fluid to be drained from the enclosure which is then unscrewed from the mounting 22 and the filter removed. By unhooking the ends of the elements 62 from the end plate grooves 48 and 50 the tension springs may be removed from the filter and then the magnets removed for cleaning, as by wiping with a cloth and solvent. When the filter has been cleaned the magnets are then replaced in the pockets, the tension springs reassembled and the filter is ready to be put back in service.

Figure 1:
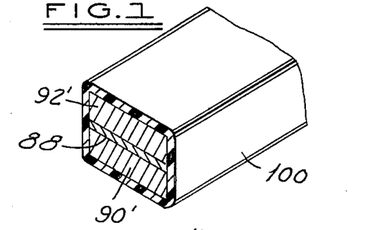
FIGS. 1-4 are fragmentary perspective end views of four forms of my improved magnetic filter elements.
Figure 2:
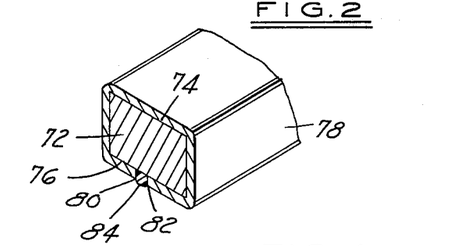
Figure 3:
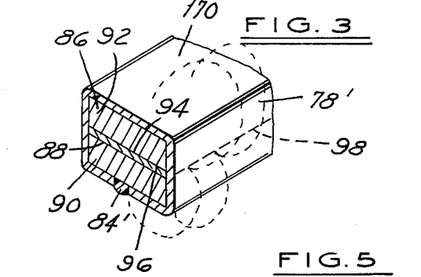
Figure 4:
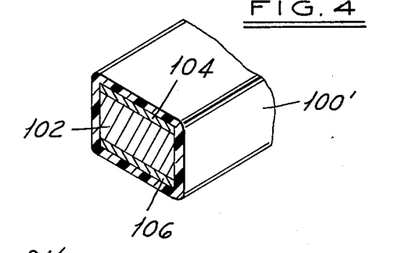
Figures 5, 6, 7, 9:
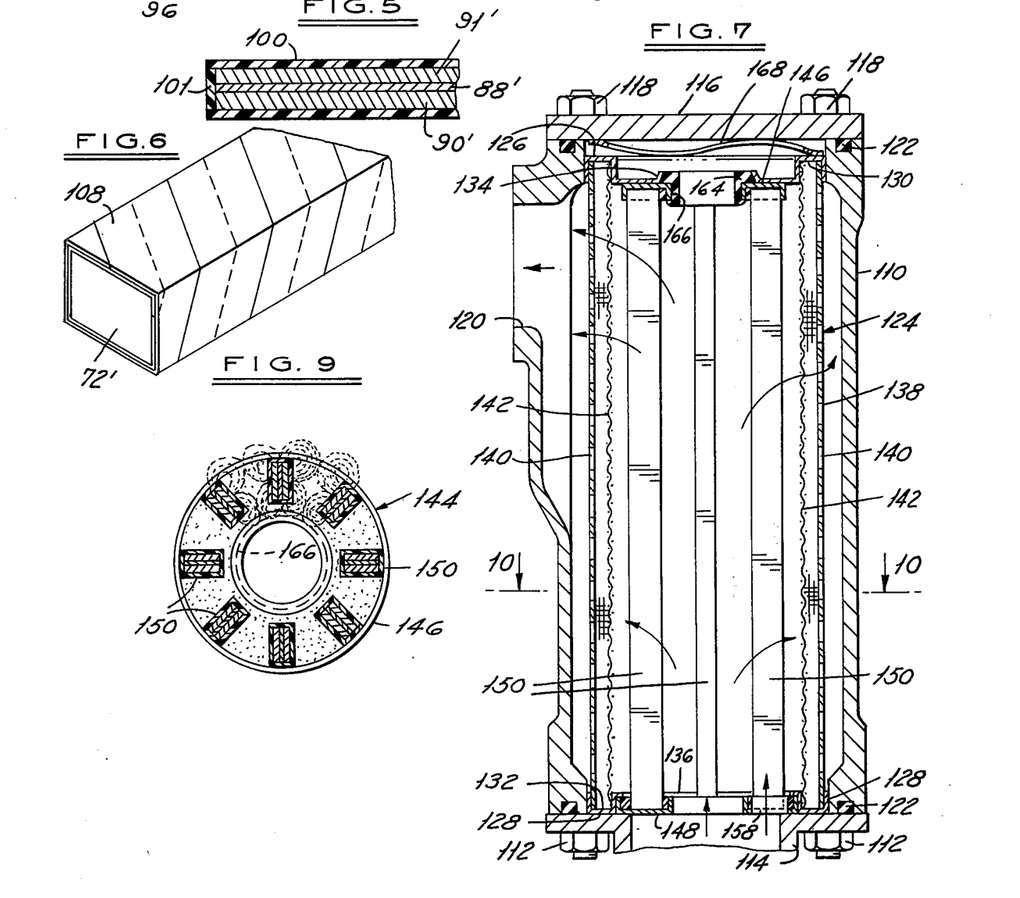
FIG. 5 is a cross sectional view taken along the longitudinal center line of the embodiment shown in FIG. 1.
FIG. 6 is a fragmentary perspective view of a spiral wrapped polyester tube enclosing a magnet strip.
FIG. 7 is a vertical cross sectional view through a filter embodying the species of the invention shown in either FIGS. 2 or 3.
FIG. 9 is a cross sectional view on the line 9—9 of FIG. 8.

The magnetic filter elements as used in the aforesaid assembly may be of specifically different constructions, as shown in FIGS. 1-6, though in each instance there are basic similarities. In each there is an elastomer bonded barium ferrite magnet core having positive and negative poles at pair of opposite faces with the core tightly enclosed in a fluid impervious, non-magnetic, thin wall envelope which is resistant to decomposition in the fluid and surrounds the core and is effectively sealed thereto. The magnet core may be a single strip enclosed in the envelope as in FIG. 2, or may be of sandwich construction as shown in FIGS. 1, 3 and 5. The envelope may be formed of plastic as shown in FIGS. 1, 4 and 6, or a stiffly resilient metal tube as shown in FIGS. 2 and 3.

Considering first FIG. 2, the magnet comprises an anisotropic rubber-bonded barium ferrite magnet strip 72. This material is available from the 3 M Company of St. Paul, Minn. under the trademark PLASTIFORM permanent magnets, in sheets or strips of various sizes. It is flexible and has a rubber like character. It is subject to deterioration when subjected to many fluids found in fluid systems when magnetic filter elements would be desirably used, and for this reason has heretofor been unacceptable for such uses.

In a typical embodiment for the FIG. 2 construction, a strip of the rubber bonded barium ferrite material has cross-section dimensions of 0.25 × 0.50 inch, with the wider faces having opposite polarities. Around this core is tightly wrapped a relatively thin wall aluminum tube 78, the wall thickness being on the order 0.010 inch. The wall thickness of the tube may be selected from aluminum sheet stock of from 0.003 to 0.015 inch. Thinner stock will not provide the desirable strength for the tube and thicker stock will result in an undesirable effective air gap around the magnet core. The edges 80 and 82 of the tube are sealed and secured by a bead of sealer 84 such as an epoxy sealer. A satisfactory sealer is sold by the 3 M Company as epoxy sealer 2214. In manufacture, the strip of magnet material has the aluminum tube 78 formed tightly about it by bending the tube stock around the core at the corners of the quadrilateral core shape so the metal tube is tightly compressed against the core, effectively providing a face-to-face contact between the inside of the tube and the flat faces of the magnet core. This tight wrapping serves not only to eliminate the possibility of an air gap between the core and tube, but also effectively seals the core against leakage of fluid therealong from the ends of the tube, and prevents longitudinal shifting of the core within the tube.

In some instances the ends of the core and enclosing tube may be left open such that the core is exposed at its ends to the fluid of the system in which the magnet is used. The tight wrap of the tube about the core has been found to prevent any appreciable migration of the fluid inwardly along the core from the ends. Alternatively, the ends of the tube may project slightly beyond the ends of the core, and the recess thereby formed may be filled with an epoxy resin sealer, thus preventing any contact between the core and fluid of the system in which the magnet is used. The tube 78 provides a relatively rigid structure which supports the flexible core and protects it both in use and during cleaning. In addition, the metal tube serves as a structural element in magnet assemblies hereinafter described.

Figures 8, 10, 11, 12:
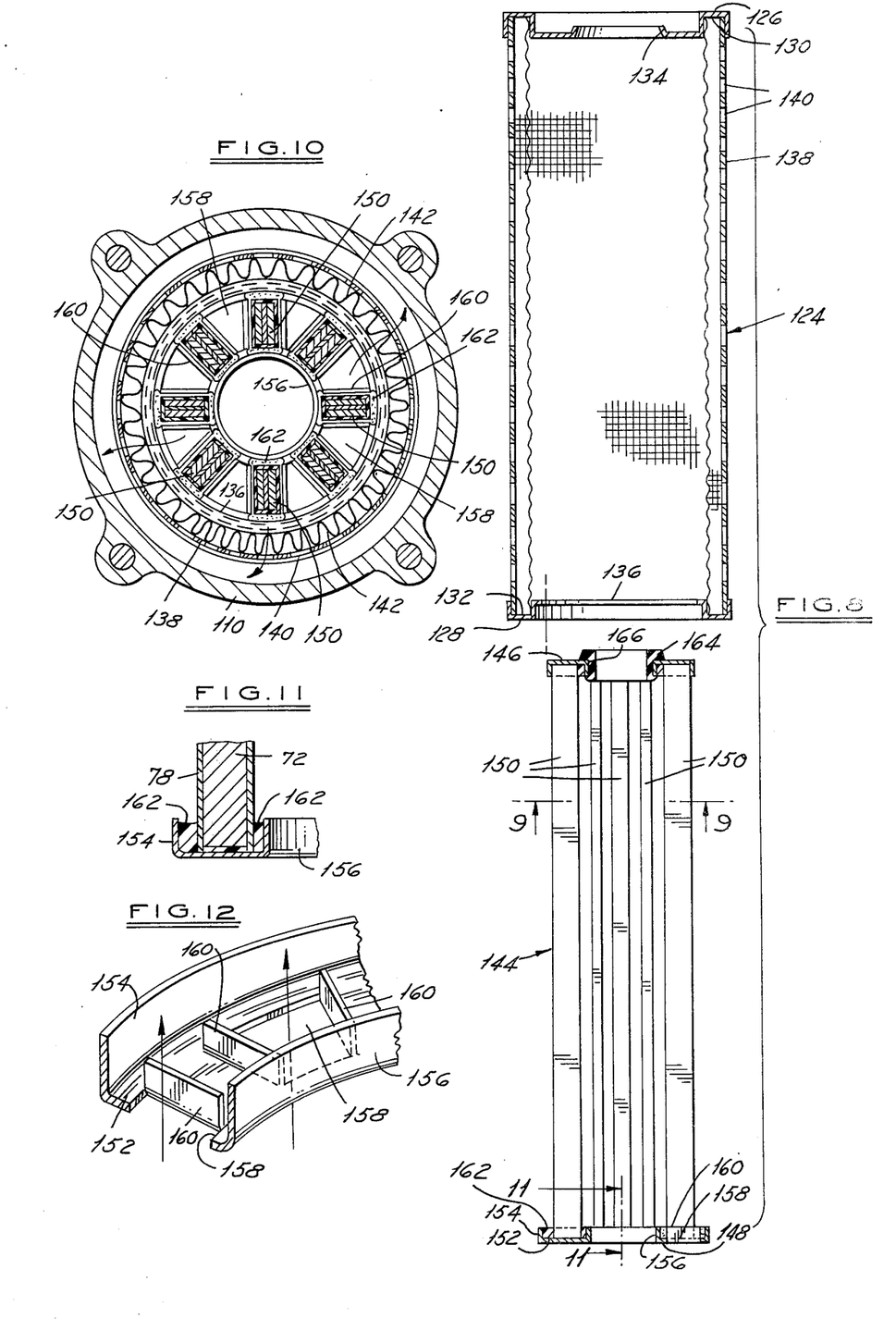
FIG. 8 is a view similar to FIG. 7 but with the magnet assembly portion of the filter removed from the filter cartridge.
FIG. 10 is a cross sectional view taken on line 10—10 of FIG. 7.
FIG. 11 is a cross sectional view taken on the line 11—11 of FIG. 8.
FIG. 12 is a perspective fragmentary view of the lower ring of the magnet filter assembly of FIG. 8.

FIG. 3 is generally similar to FIG. 2 and includes a similar aluminum tube 78, but the magnet core 86 comprises a sandwich construction of a stiffly resilient ferromagnetic layer or strip 88 for example 0.036 inch thick cold rolled steel disposed between a pair of rubber bonded barium ferrite layers or strips 88 and 90 each having for example cross-sectional dimensions of 0.125 × 0.50 inch. The magnet layers should have similar poles at the faces 92 and 94 juxtaposing opposite faces of the layer 88. The effect of the ferromagnetic layer with the poles arranged as aforesaid is to cause the magnetic lines of flux to pass out of the tube through the wider faces and enter the tube along the median line of the narrow faces (or vice versa depending on the polarity). For example, if a north polarity is chosen for the faces 94 and 96 juxtaposing the ferromagnetic layer, then a north polarity will be present along the medial line 98 at the narrow faces and the lines of flux will curve around each edge of the magnet as shown in FIGS. 3 and 10, the latter being hereinafter described.

In FIG. 1 a construction similar to FIG. 3 is shown except the tube is non-metallic. Preferably the tube 100 is a shrink-wrap seamless sleeve of polyethylene terephtlalate (polyester), having a wall thickness of from 0.002 to 0.003 inch before shrinking. Tubing having this wall thickness is available from Gilbreth International Corporation of Cornwells Heights, Pa., and is described by such company as a "skintight polyester heat shrinkable tubing". Tubing of at least 0.001 inch thickness prior to shrinking appears necessary to render the tubing impervious to fluid passage therethrough. Tubing greater than 0.015 would generally be unsatisfactory because of the air gap created thereby about the magnet core. I have found in testing that a seamless heat shrinkable polyester tube is necessary to satisfactory results. However, if the tube is formed by a spiral wrap as shown in FIG. 6, where a single layer is lapped on itself by about one-half its width and the lapped surfaces heat sealed together, the resulting tube appears satisfactory.

The core of the FIG. 1 embodiment is similar to that described in connection with FIG. 3. In assemblying the FIG. 1 structure, the layers 90' and 92' are juxtaposed with common polarity faces against the ferromagnetic layer 88' and then while held together the sandwich is inserted in a polyester tube. Heat is applied to the tube, as for example 90° C, to cause it to shrink tightly about the sandwich securing the sandwich together and sealing it from contact with the fluid medium in which the magnet will be used. Upon removal of the heat and cooling of the tube the magnet is ready for use. The open ends of the tube may be closed, if desired, by application of an epoxy sealer thereto.

The ferromagnetic layer 88' in the FIG. 1 embodiment not only performs the function mentioned in connection with FIG. 3, but also serves to rigidify the plastic tube enclosed sandwich and thus renders it suitable for use in the environment of the FIGS. 16 and 17 construction. Optimally the ferromagnetic layer should have a thickness at least equal to 1/12 the combined thicknesses of the magnetic layers. Because of the softer and more easily rupturable nature of tube 100, greater care must be exercised in cleaning the magnet constructed in this fashion and in some instances such magnets may be treated as a single use, throw-away type.

In FIG. 5 a longitudinal cross section through the FIG. 1 embodiment is shown. The ends of the tube project beyond the magnetic sandwich core and an epoxy sealer 101 fills the end thus preventing any contact of the fluid with the core.

In FIG. 4 I have shown a magnet structure utilizing the heat shrinkable polyester tubing, but for added rigidity and to alter the magnetic field pattern a sandwich construction utilizes a central layer of rubber bonded barium ferrite 102 and juxtaposed ferromagnetic layers 104 and 106 on opposite faces thereof, the faces of the magnet layer juxtaposing the ferromagnetic layer being of opposite polarity. In a typical construction the rubber bonded barium ferrite layer may have cross-sectional dimensions of 0.25 × 0.50 inch, and the ferromagnetic layers may be from 0.010 to 0.047 inch thick cold rolled steel 0.50 inch wide. Such ferromagnetic layers should be selected to have a thickness giving sufficient mechanical strength and a combined thickness of at least 1/12 of the magnet layer thickness. Following formation of the sandwich and while holding it together, it is inserted in the polyester tube which is then heat shrunk tightly thereabout. The open ends may be sealed with epoxy resin as desired.

In FIG. 6 the polyester tube is formed by a spiral wrap layer 108. The layer comprises a strip of polyester which has been lapped upon itself by one-half its width, thus effectively rendering a tube twice the thickness of the strip itself. During manufacture of such tube the lapped surfaces are heat sealed. In assemblying such a tube about the core 72', the core is inserted and heat applied to the tube to shrink it down tightly thereabout.

The magnetic filter elements shown in FIGS. 1-6 and above described may be incorporated in a variety of filter structures, one example of which is the structure of FIGS. 16 and 17 previously described. In this structure any of the magnet constructions of FIGS. 1-6 may be used, though I have shown the magnet structure of FIG. 2 as representative.

FIGS. 7-12 show a different filter construction utilizing my improved magnets. In FIG. 7 a conventional filter enclosure comprises a housing 110 bolted at 112 to portion 114 of the fluid pressure system, the housing being closed at the opposite end by a cover plate 116 bolted thereto at 118, and an outlet 120 is provided as shown. Fluid in the system enters at the bottom and flows as indicated by the arrows and exits at 120 where it re-enters the fluid system through suitable passageways not shown. Seals 122 render the enclosure fluid tight. Removably received within the enclosure is a filter cartridge 124 of cylindrical configuration best shown in FIGS. 8-12. The cartridge comprises opposite circular end plates 126 and 128 having peripheral grooves 130 and 132 and central apertures 134 and 136. An outer cylindrical wall 138, perforated throughout its area at 140, is seated and secured at opposite ends in grooves 130 and 132.

Aperture 136 is dimensioned to receive axially therethrough a magnetic filter assembly 144 comprising a pair of end plates 146 and 148 between which extend in parallel circumaxially spaced relation a plurality of magnetic elements 150, either of the type shown in FIGS. 2 or 3. The end plates 146 and 148 each comprises as shown in FIG. 12 annular channels having a bottom wall 152 and opposed side walls 154 and 156. The bottom wall of plate 148 is punched at equidistantly spaced location to provide fluid flow apertures 158 and upstanding integral locating tabs 160. The ends of the magnetic elements are disposed between the opposed walls 154 and 156 and in plate 148 also between tabs 160 on opposite sides of the apertures 158. The elements may be secured rigidly therein by an epoxy sealer 162 as shown in FIG. 11. A sealing grommet or gasket 164 is mounted in the aperture 166 defined by the annular configuration of plate 146 and cooperates with the end plate aperture 134 to prevent escape of fluid between plates 146 and 126 when the magnet assembly is fully inserted and seated in the filter canister. The end plate 148 of the magnet assembly nests as shown in FIG. 7 in the end plate 128 of the filter canister when the structures are assembled together. A conventional spring element 168 disposed between the cam plate 116 and end plate 126 of the canister holds the assembly against vibration within the enclosure.

In FIG. 10 I have shown the magnets 150 of the type depicted in FIG. 3. The wider faces 170 define fluid passageways between the magnetic elements and thus are swept by fluid flow passing between the magnets. The magnetic lines of flux are depicted in FIG. 9 and bridge the pie-shaped spaces or fluid passages between the magnets and capture magnetically attractable contaminants in the fluid holding such contaminants to the faces 168. To clean the filter assembly for reuse, upon removal from the enclosure 110 the magnet assembly 144 is extracted from the filter canister and each magnet wiped down with a cloth and solvent, and the canister itself cleaned by conventional techniques.

Figure 13:
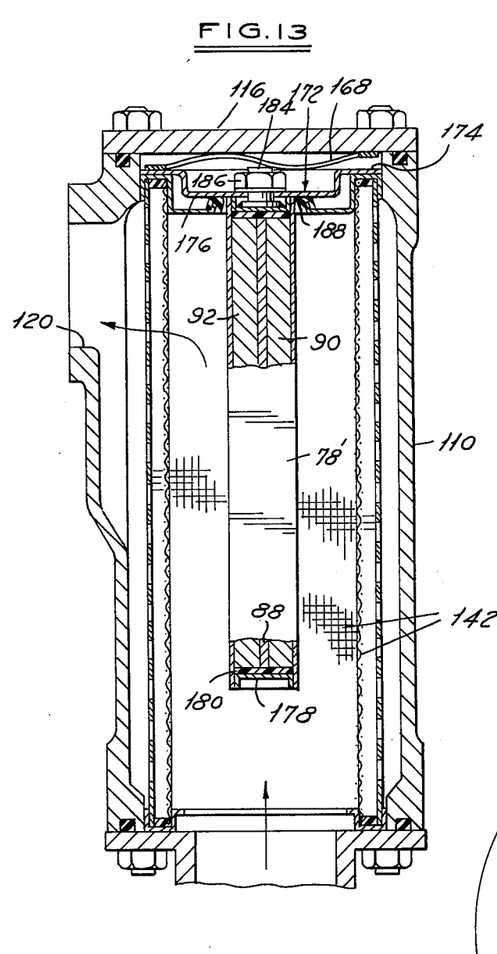
FIG. 13 is a vertical cross sectional view through another magnet filter embodying my invention.
Figure 14:
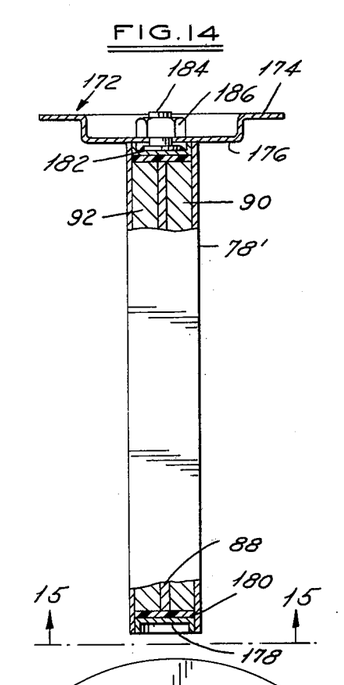
FIG. 14 shows the magnet filter element removed from the FIG. 13 environment.
Figure 15:
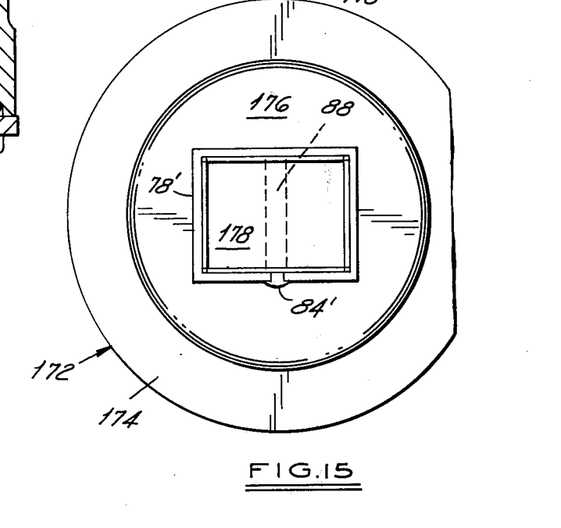
FIG. 15 is an end view looking in the direction of arrow 15—15 of FIG. 14.

In FIGS. 13-15 I have shown a somewhat different magnet assembly for use with a filter canister or cartridge 124 corresponding to that of FIG. 8. As the enclosure 110 corresponds to that of FIG. 7 its description is omitted. The magnet assembly includes an end plate 172 of hat shaped configuration having a peripheral flange portion 174 surrounding a stepped down central portion 176. A magnetic element of the type shown in FIG. 3 includes the non-magnetic aluminum tube 78' enclosing the sandwich core comprising a ferromagnetic strip 88 between the rubber bonded barium ferrite magnet layers 90 and 92. The ends of the tube 78' extend beyond the core and an aluminum plug 178 or the like may be secured by epoxy 180 in the lower end to seal the tube thereat, while at the upper end a similar plug 182 is secured in like manner in the tube. A threaded stub 184 has one end rigidly secured as by welding, or in any other suitable fashion to plug 182 and projects beyond the end of the tube and through the center of the end plate 172 where a nut 186 threaded on the stud serves to rigidly connect the magnet to the plate in substantially perpendicular relation.

Referring to FIG. 13, the magnet assembly of FIG. 14 is inserted through the aperture 134 of the filter cartridge and sealed therein as by a sealing gasket 188. The spring 168 disposed between the flange 174 and the cover plate 116 holds the end plate 172 against the canister. Fluid flow entering the enclosure at the bottom as shown by the arrows first passes around the magnet and thence radially outwardly through the canister to exit through opening. The magnet serves to capture to it magnetically attractable contaminants in the fluid. The magnet may be readily cleaned upon disassembly from the cartridge by wiping down with a cloth and solvent.

Preferrably the magnets are disposed in association with the filter canisters so that the fluid to be filtered passes by the magnets before flowing through the filter screen, and this arrangement will be noted in FIGS. 7, 13 and 16. This allows the magnet to capture and retain magnetically attractable contaminants larger than the mesh size of the screen and thus avoids unnecessarily clogging the screen with contaminants that the magnet can retain rendering the total filter more efficient.

Tests of magnets and magnet assemblies constructed according to the foregoing disclosure have shown good results in hydraulic systems with temperatures from −40° F to 275° F for 1800 hours, at which time the tests were discontinued. When the fluids in the system comprise mixtures of water and glycols and/or phosphate ester fluids, the aluminum tube material should be anodized to withstand attack by such fluid media.

I have found that the polyester resin tube preferably should be selected as to diameter and length such that when it is shrunk tightly about the magnet core, residual shrinkage during service is minimal.

What is claimed is:

1. A fluid filter element assembly comprising, in combination:
    a plurality of elongated elastomer bonded barium ferrite permanent magnets having elongated opposed faces of opposite polarity and spaced apart opposite ends,
    a thin fluid impervious envelope surrounding each magnet and formed of a non-magnetic material resistant to decomposition in the fluid to be filtered,
    elongated stiffening means for each magnet for preventing distortion of the magnet under elevated temperatures of the fluid to be filtered,
    a cylindrical fluid filter structure defining openings through which the fluid to be filtered passes,
    said magnets arranged in spaced apart relation around said filter structure and extending axially thereof adjacent said openings to impress a magentic field across said openings, and
    means encircling the filter structure and overlying the magnets and located between the spaced apart opposite ends of the magnets to retain them in the aforesaid position whereby said stiffening means retains the magnet ends adjacent said openings.

2. The invention defined by claim 1 characterized in that each elongated permanent magnet is rectangular in cross section, and the wider faces of said rectangular shape are the faces of opposite polarity.

3. The invention defined by claim 1 wherein said stiffening means is disposed within the fluid impervious envelope.

4. The invention defined by claim 1 wherein the thin fluid impervious envelope and the elongated stiffening means comprise a stiffly resilient fluid impervious metallic envelope.

5. The invention defined by claim 1 wherein said elongated stiffening means comprises a pair of ferromagnetic metallic stiffening layers between which is sandwiched the permanent magnet, and the envelope comprises a polyester resin tube tightly stretched about the permanent magnet and said stiffening layers.

6. The invention defined by claim 1 wherein said envelope comprises an aluminum casing having a wall portion tightly wrapped about the permanent magnet with the joint at the meeting edges of the wall portion rendered fluid impervious by a plastic sealer.

7. The invention defined by claim 1 wherein sealing means overlie said opposite ends of each magnet and is bonded to the envelope to seal the ends thereof and prevent ingress of fluid to the magnet.

8. The invention defined by claim 1 wherein the elongated stiffening means comprises a ferromagnetic metallic stiffening layer and each permanent magnet comprises a pair of magnet layers, and the ferromagnetic strip is sandwiched between the magnet layers.

9. The invention defined by claim 8 wherein the faces of the magnet layers adjacent the stiffening layer are of like magnetic polarity.

10. The invention defined by claim 1 characterized in that the envelope is formed of a polyester resin tube having spiral wound lapped and sealed layers.

11. A magnet assembly for use as a magnetic filter in a fluid system comprising:
a plurality of elongated strip-like elastomer bonded barium ferrite permanent magnets subject to deterioration in the fluid in which the magnets are to be situated and having opposed faces of opposite polarities,
a thin fluid impervious envelope tightly embracing each magnet and sealed and closely conforming thereto and formed of a non-magnetic material resistent to decomposition in the fluid in which the magnets are to be situated,
means for rigidifying each permanent magnet and preventing distortion thereof when subjected to elevated temperatures of the fluid system,
each of said magnets arranged in parallel circumaxially spaced apart relation providing fluid flow spaces therebetween,
a pair of disc-like end plates overlying opposite ends of the magnets and said means to fix them in the aforesaid relation, and
means for securing the magnets and end plates together in a relatively rigid structure.

12. The invention defined by claim 11 wherein said means for securing the magnets to the end plates also seals the ends of the envelopes against ingress of the fluid medium in which the assembly is to be used.

13. The invention defined by claim 11 wherein at least one of said end plates is provided with a central through aperture for passage of fluid through the plate.

14. The invention defined by claim 11 wherein each magnet is of rectangular cross sectional shape, and the wider faces of the magnets are disposed to define opposite sides of said fluid flow spaces between the magnets for capturing on said wider faces magnetically attractable particles flowing through said spaces.

15. The invention defined by claim 11 wherein said end plates each comprise an annular channel shaped member having a bottom wall portion and opposed side wall portions with the channels opening toward each other, the bottom wall portion of one of said channel shaped members having upstanding integral tabs at opposite edges of circumaxially spaced apertures in the bottom wall, and said magnets having their ends disposed between said tabs and side wall portions and secured to the end plates.

16. A fluid filter assembly comprising, in combination:
a cylindrical filter having a fluid pervious cylindrical wall structure for filtering contaminants from fluid flow passing therethrough
said cylindrical wall structure defining concentric circular openings at opposite ends,
a magnetic filter element removably axially received in said cylindrical filter and having a circular end plate portion nesting in one of said circular openings and at least one elongated magnet portion secured to said end plate and extending perpendicularly therefrom into the cylindrical filter and toward the opposite end thereof, said magnet portion comprising an elastomer bonded barium ferrite permanent magnet subject to deterioration in the fluid in which the magnet is to be situated and shaped in the form of an elongated strip having a pair of opposed faces of opposite polarities,
a thin fluid impervious envelope tightly embracing the magnet and sealed and closely conforming thereto and formed of a non-magnetic material resistent to decomposition in the fluid in which the magnet is to be situated, and
means for rigidifying the magnet and preventing distortion thereof when subjected to elevated temperatures of the fluid system.

17. The invention defined by claim 16 wherein said magnetic filter element includes a pair of circular end plates and a plurality of elongated magnet portions are disposed in circumaxially spaced arrangement and extend between and are secured to said end plates.

18. A magnetic filter element for use in a fluid flow filter having a cylindrical wall defining a hollow interior opening outwardly at one end through a circular opening, comprising:
a disc-like end plate for removable reception in the circular opening of the filter,
an elastomer bonded barium ferrite permanent magnet subject to deterioration in the fluid in which the magnet is to be situated and shaped in the form of an elongated strip having opposed faces of opposite polarities,
a thin fluid impervious envelope tightly embracing the magnet and sealed and closely conforming thereto and formed of a non-magnetic material resistent to decomposition in the fluid in which the magnet is to be situated,
means for rigidifying the magnet and preventing distortion thereof when subjected to elevated temperatures of the fluid system,
and said envelope secured at one end centrally to the end plate and extending perpendicularly thereof for reception within the hollow interior of the filter.

19. The invention defined by claim 18 characterized in that said means comprises a ferromagnetic strip sandwiched between a pair of magnet strips, each magnet strip being of rectangular cross-section with the ferromagnetic strip abutting the wider faces thereof, and said wider faces abutting the ferromagnetic strip having like polarities.

20. The invention defined by claim 18 wherein said sleeve is of metal, and fastener means are secured to one end of the sleeve and project axially therefrom and through the end plate for connecting the magnet and sleeve to the plate.

21. A fluid filter assembly comprising, in combination:
- a hollow cylindrical fluid filter having a fluid pervious filter wall structure
- said wall structure defining axially extending circumaxially spaced grooves in the outside surface thereof,
- a plurality of magnet strips received in and supported by the grooves,
- each magnet strip comprising elastomer bonded barium ferrite permanent magnet subject to deterioration in the fluid in which the magnet is to be situated and shaped in the form of an elongated strip having a pair of opposite faces of opposite polarities,
- a thin fluid impervious envelope tightly embracing the magnet strip and sealed and closely conforming thereto and formed of a non-magnetic material resistant to decomposition in the fluid in which the magnet is to be situated,
- means for rigidifying the magnet strip and preventing distortion thereof when subjected to elevated temperatures of the fluid system, and
- means for retaining the magnet strips in the grooves.

22. A fluid filter element assembly comprising, in combination:
- a plurality of elastomer bonded barium ferrite permanent magnets subject to deterioration in the fluid in which they are to be situated and each shaped in the form of an elongated strip having a pair of opposite faces of opposite polarities and spaced opposite ends,
- a ferromagnetic strip juxtaposing at least one of said faces of each magnet and of substantially equal width and length therewith for rigidifying the same and preventing distortion thereof when subjected to elevated temperatures of the fluid system and concentrating the magnet field along the opposite edges of such juxtaposed face,
- a thin fluid impervious envelope tightly enclosing each magnet and said ferromagnetic strip and closely conforming thereto and serving to hold the magnet and ferromagnetic strip in the aforesaid relation and formed of a non-magnetic material resistant to decomposition in the fluid in which the magnet is to be situated,
- a generally cylindrical fluid pervious wall structure,
- said magnets arranged in parallel spaced apart relation around the outside of said wall and extending axially thereto to impress magnetic fields across the pervious wall and the path of fluid flow therethrough, and
- means encircling the wall structure and said magnets and located between said spaced apart opposite ends for retaining the latter in the aforesaid position whereby said ferromagnetic strip retains the magnet ends juxtaposed against the pervious wall.

* * * * *